United States Patent
Zhou et al.

(10) Patent No.: US 10,136,117 B2
(45) Date of Patent: *Nov. 20, 2018

(54) VIDEO DISPLAY CONTROL METHODS AND APPARATUSES AND DISPLAY DEVICES

(71) Applicant: Beijing Zhigu Rui Tuo Tech Co., Ltd, Beijing (CN)

(72) Inventors: Liang Zhou, Beijing (CN); Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 71 days.

This patent is subject to a terminal disclaimer.

(21) Appl. No.: 15/167,877

(22) Filed: May 27, 2016

(65) Prior Publication Data

US 2016/0353077 A1  Dec. 1, 2016

(30) Foreign Application Priority Data

May 30, 2015  (CN) .......................... 2015 1 0290908

(51) Int. Cl.
*H04N 13/00* (2018.01)
*H04N 13/30* (2018.01)
(Continued)

(52) U.S. Cl.
CPC ......... *H04N 13/139* (2018.05); *H04N 13/128* (2018.05); *H04N 13/144* (2018.05);
(Continued)

(58) Field of Classification Search
None
See application file for complete search history.

(56) References Cited

U.S. PATENT DOCUMENTS 5,706,053 A * 1/1998 Urano .................. H04N 19/895
375/240.15
5,841,439 A  11/1998 Pose et al.
(Continued)

FOREIGN PATENT DOCUMENTS

CN  1193389  9/1998
CN  1645187  7/2005
(Continued)

OTHER PUBLICATIONS

Chinese Office Action dated Sep. 25, 2017 for Chinese Application No. 201510290908.5, 15 pages (with translation).
(Continued)

*Primary Examiner* — Reza Aghevli
(74) *Attorney, Agent, or Firm* — Amin, Turocy & Watson, LLP (57) ABSTRACT

Various video display control methods and apparatuses and various display devices are provided. A method comprises: acquiring interframe differences between every two adjacent frames in at least two adjacent video frames in sequence of a video; determining a display image distance of at least one video frame in the at least two video frames at least according to respective interframe differences of the interframe differences, and controlling the display device to display the at least one video frame at least according to the determined display image distance of the at least one video frame. A visual effect and user experience can thereby be improved.

32 Claims, 2 Drawing Sheets

(51) Int. Cl.
*H04N 13/139* (2018.01)
*H04N 13/128* (2018.01)
*H04N 13/144* (2018.01)
*H04N 13/398* (2018.01)
*H04N 13/344* (2018.01)

(52) U.S. Cl.
CPC ........... *H04N 13/30* (2018.05); *H04N 13/344* (2018.05); *H04N 13/398* (2018.05); *H04N 2013/0081* (2013.01)

(56) References Cited

U.S. PATENT DOCUMENTS

| | | | |
|---|---|---|---|
| 9,105,306 B2* | 8/2015 | Ishikawa | G06K 9/00288 |
| 2003/0043276 A1* | 3/2003 | Tojo | G11B 27/032 |
| | | | 348/207.99 |
| 2004/0006273 A1* | 1/2004 | Kim | A61B 8/483 |
| | | | 600/443 |
| 2004/0119662 A1 | 6/2004 | Dempski | |
| 2005/0179868 A1 | 8/2005 | Seo et al. | |
| 2006/0146056 A1 | 7/2006 | Wyatt | |
| 2007/0272369 A1* | 11/2007 | Saito | G01R 33/0047 |
| | | | 160/127 |
| 2009/0116751 A1* | 5/2009 | Kudo | H04N 5/147 |
| | | | 382/201 |
| 2009/0279840 A1* | 11/2009 | Kudo | G11B 27/031 |
| | | | 386/278 |
| 2011/0304697 A1 | 12/2011 | Kim et al. | |
| 2012/0218473 A1 | 8/2012 | Xu et al. | |
| 2013/0128230 A1 | 5/2013 | Macnamara | |
| 2013/0182184 A1 | 7/2013 | Senlet et al. | |
| 2013/0285885 A1 | 10/2013 | Nowatzyk et al. | |
| 2014/0003762 A1 | 1/2014 | Macnamara | |
| 2014/0184743 A1* | 7/2014 | Chen | H04N 13/0007 |
| | | | 348/43 |
| 2014/0268356 A1 | 9/2014 | Bolas et al. | |
| 2014/0340638 A1* | 11/2014 | Imamura | A61B 3/1025 |
| | | | 351/206 |
| 2014/0361977 A1 | 12/2014 | Stafford et al. | |
| 2014/0375540 A1 | 12/2014 | Ackerman et al. | |
| 2016/0205291 A1* | 7/2016 | Narahari | H04N 5/211 |
| | | | 348/208.1 |
| 2016/0253801 A1 | 9/2016 | Linard et al. | |
| 2016/0335487 A1 | 11/2016 | Ming et al. | |

FOREIGN PATENT DOCUMENTS

| | | |
|---|---|---|
| CN | 101059600 | 10/2007 |
| CN | 101300520 | 11/2008 |
| CN | 102333228 A | 1/2012 |
| CN | 102445756 A | 5/2012 |
| CN | 102447919 A | 5/2012 |
| CN | 102466888 | 5/2012 |
| CN | 103079037 | 5/2013 |
| CN | 104246578 A | 12/2014 |
| WO | 9641227 | 12/1996 |

OTHER PUBLICATIONS

Office Action dated Jan. 9, 2018 for U.S. Appl. No. 15/167,950, 34 pages.
Chinese Office Action dated Sep. 25, 2017 for Chinese Application No. 201510290798.2, 13 pages (with translation).
Office Action dated Jul. 27, 2018 for U.S. Appl. No. 15/166,260, 43 pages.
Chinese Office Action for Chinese Application Serial No. 201510290796.3 dated Aug. 28, 2018, 14 pages (with translation).

* cited by examiner

VIDEO DISPLAY CONTROL METHODS AND APPARATUSES AND DISPLAY DEVICES

RELATED APPLICATION

The present application claims the benefit of priority to Chinese Patent Application No. 201510290908.5, filed on May 30, 2015, and entitled "Video Display Control Methods and Apparatuses and Display Devices", which application is hereby incorporated into the present application by reference herein in its entirety.

TECHNICAL FIELD

The present application relates to the technical field of display, and, for example to various video display control methods and apparatuses and various display devices.

BACKGROUND

With continuous development of display technologies, types of display devices are developed continuously, for example, continuous development of novel display devices such as a 3D display, a near-to-eye display device and a light field display, and diversified application requirements are met.

In certain situations, difference of different video frames comprised in a video affects a visual effect of its displayed content, for example, difference of different video frames possibly causes phenomena such as a stuck screen, lag, judder, or trailing during video display of the display device, and a poor visual effect is caused.

SUMMARY

The following briefly describes the present application, so as to provide a basic understanding of some aspects of the present application. It should be understood that, the brief description is not an exhaustive brief description of the present application. The description is neither intended to determine key or important parts of the present application, nor intended to limit the scope of the present application. An objective thereof is merely to give some concepts in a simplified manner as a preface for more detailed description hereinafter.

The present application provides various video display control methods and apparatuses and various display devices.

In a first aspect, an example embodiment of the present application provides a video display control method, comprising:

acquiring interframe differences between every two adjacent frames in at least two adjacent video frames in sequence of a video;

determining a display image distance of at least one video frame in the at least two video frames at least according to respective interframe differences; and controlling a display device to display the at least one video frame at least according to the determined display image distance of the at least one video frame.

In a second aspect, an example embodiment of the present application further provides a video display control apparatus, comprising:

an interframe difference acquiring module, configured to acquire interframe differences between every two adjacent frames in at least two adjacent video frames in sequence of a video;

a display image distance determining module, configured to determine a display image distance of at least one video frame in the at least two video frames at least according to respective interframe differences; and a display control module, configured to control the display device to display the at least one video frame at least according to the determined display image distance of the at least one video frame.

In a third aspect, an example embodiment of the present application also provides a near-to-eye display device, comprising:

a processor, a communication interface, a memory and a communication bus; the processor, the communication interface and the memory communicate with one another by the communication bus;

the memory is configured to store at least one command; the command causes the processor to perform following operations:

acquiring interframe differences between every two adjacent frames in at least two adjacent video frames in sequence of a video;

determining a display image distance of at least one video frame in the at least two video frames at least according to respective interframe differences; and displaying the at least one video frame at least according to the determined display image distance of the at least one video frame.

According to the various embodiments of the present application, association between an interframe difference between at least two adjacent video frames and a display image distance in a video is established, the display image distance of the corresponding video frame is pertinently adjusted at least according to the interframe difference, the corresponding video frame is displayed according to the determined display image distance, therefore, by adaptive adjusting of the display image distance of the corresponding video frame, uncomfortable visual perception of the user possibly caused by the overlarge interframe difference can be weakened to certain extent, that is to say, the visual perception of the eyes to display effects such as a stuck screen, lag, judder or trailing possibly caused by the overlarge interframe difference is weakened to certain extent by adjusting the display image distance, thereby a visual effect and user experience are improved.

The following describes in detail alternative embodiments of the present application with reference to accompanying drawings, to make these and other aspects of the present application more obvious.

BRIEF DESCRIPTION OF THE DRAWINGS

The present application may be understood better with reference to the following description in combination with accompanying drawings, wherein a same or similar accompanying drawing mark is used in all the accompanying drawings to represent a same or similar component. The accompanying drawings together with the following detailed description are comprised in the specification and constitute a part of the specification, and are used to further illustrate alternative embodiments of the present application and explain the principle and advantages of the present application. In the accompanying drawings.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancing an understanding of the embodiments of the present application.

DETAILED DESCRIPTION

The following will describe in details illustrative embodiments of the present application with reference to accompanying drawings. For the purpose of clear and brief description, the specification does not describe all features of practical example embodiments. However, it should be understood that, many decisions specific to the example embodiments can be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail example embodiments of the present application with reference to the accompanying drawings (a same label represents a same element in several accompanying drawings) and corresponding description. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logic sequence among them.

Figure 1:
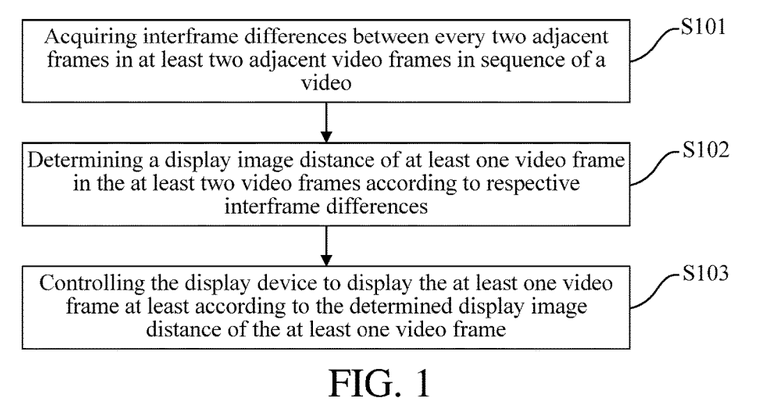
FIG. 1 is a flowchart of a video display control method according to an example embodiment of the present application.

FIG. 1 is a flowchart of a video display control method according to an embodiment of the present application. The video display control method provided by this embodiment of the present application may be executed by certain video display control apparatus, and the video display control apparatus can perform display control by executing the video display control method, comprising but not limited to before or during video display. There is no limit to the manners in which the video display control apparatus is embodied. For example, the video display control apparatus may be an independent part, and the part cooperates with a display device in communication; or the video display control apparatus may be a functional module integrated in a display device, etc., which is not limited in this embodiment of the present application.

Specifically, as shown in FIG. 1, a video display control method provided by this embodiment of the present application comprises:

S101: Acquiring interframe differences between every two adjacent frames in at least two adjacent video frames in sequence of a video;

S102: Determining a display image distance of at least one video frame in the at least two video frames at least according to respective interframe differences; and S103: Controlling the display device to display the at least one video frame at least according to the determined display image distance of the at least one video frame.

The inventor of the present application found during implementation of this embodiment of the present application that for a video to be displayed, display image distances of respective video frames comprised in the video generally adopt default display image distances, and display image distances of different video frames are basically same. However, in certain conditions, certain video may comprise multiple scenes with large differences, or certain video may have related content of movement information of one or more display objects, and the like, which causes the interframe difference between two adjacent video frames in the video to be overlarge, for example, two different video frames respectively correspond to contents of different scenes, or, the same display object in the two adjacent video frames has overhigh movement speed, etc. In these situations, limited to reasons such as data processing capacity, of the video display control apparatus and split vision persistence of a display device, phenomena such as a stuck screen, lag, judder, or trailing during video display of the display device may occur during video display, and a visual effect of a user is poor.

Research shows that in terms of visual features of eyes, the eyes are relatively sensitive to display content closer to the eyes and are insensitive to the display content farther away from the eyes. For example, for the same display detail of the display content, the display content is respectively displayed at a first position closer to the eyes and a second position farther away from the eyes, the visual resolution of the eyes to the detail of the display content at the first position is higher than the visual resolution of the eyes to the detail of the display content at the second position. Considering this, according to the technical solutions provided by the embodiments of the present application, association between an interframe difference between at least two adjacent video frames and a display image distance in a video is established, the display image distance of the corresponding video frame is pertinently adjusted at least according to the interframe difference, and the corresponding video frame is displayed according to the determined display image distance, therefore, by adaptive adjusting of the display image distance of the corresponding video frame, uncomfortable visual perception of the user possibly caused by the overlarge interframe difference can be weakened to certain extent, that is to say, the visual perception of the eyes to display effects such as a stuck screen, lag, judder or trailing possibly caused by the overlarge interframe difference is weakened to certain extent by adjusting the display image distance, thereby a visual effect and user experience are improved.

The display image distance of any video frame is the distance between an image of the video frame through an optical part of the display device and the optical part. In technical solution provided by the embodiment of the present application, display image distances corresponding to different video frames in certain video may be different, in the video display process of the display device, optical parameters of the display device are adjusted to match with the display image distances of different video frames, the optical parameters comprise but are not limited to focus length and/or refractive index of the optical part; for another example, by content pretreatment of different video frames, the content of respective video frames is displayed to refocusing planes of corresponding depths; for another example, the display device can comprise different waveguide layers distributed along the depth direction, different waveguide layers are configured to reconfigure light field information of different depths of planes, each waveguide layer comprises a plurality of light splitters and a miniaturized micro curve reflector, incident light images after transmission of the waveguide layers, which is equivalent to rebuilding of light field information of the corresponding video frame on one specific depth plane, by changing the waveguide layers for transmitting imaging light of different video frames, light field information of corresponding video frames can be reconfigured on different depths, thereby corresponding video frames are displayed by adopting pertinent display image distances.

In the technical solution provided by the embodiment of the present application, at least one video frame in the at least two video frames comprises any video frame in the at least two video frames. Optionally, the at least one video frame in the at least two video frames comprises: at least one former video frame in the at least two video frames and/or at least one latter video frame in the at least two video frames. The former video frame and the latter video frame are relative concepts, for the N (N is an integer larger than 1) continuously distributed video frames in the video, besides the last video frame in the N video frames, other respective video frames can form the former video frame in certain situations, similarly, besides the first video frame in the N video frames, other respective video frames can form the latter video frame in certain situations, for example, for the two adjacent video frames in sequence, the first video frame is the former video frame, and the second video frame is the latter video frame.

The at least two adjacent video frames in sequence in a video can comprise the situation of two adjacent video frames in the video and also comprise the situation of three adjacent video frames in sequence or more than three video frames in the video. In a practical application process, the interframe difference between every two adjacent video frames in respective video frames comprised in certain time window can be determined by a time window sliding-similar manner according to time sequence, and a display image distance of at least one frame in the at least two video frames is determined according to respective interframe differences. For example, for N adjacent video frames {1, 2 . . . N-2, N-1, N} in sequence in a video, the interframe differences $\Box_{1,2}, \Box_{2,3} \ldots \Box_{N-2,N-1}, \Box_{N-1,N}$ between every two adjacent video frames in the N video frames are respectively calculated, the display image distance of certain video frame can be adjusted according to one or more determined interframe differences, for example, the display mage distance of the first video frame can be determined according to the interframe difference $\Box_{1,2}$ between the first and second video frames, and can also be determined according to a content change tendency reflected by the multiple interframe differences $\Box_{1,2}, \Box_{2,3} \ldots \Box_{N-2,N-1}, \Box_{N-1,N}$, etc., and a realizing manner is very flexible. In addition, the display image distance of certain video frame can be determined in real time during video display, which is not limited by the embodiment of the present application.

In a practical application process, respective interframe differences can be compared with certain preset condition respectively, and different strategies for adjusting the display image distance can be adopted according to a comparison result, to improve universality and flexibility of the solution.

Optionally, the determining the display image distance of at least one video frame in at least two video frames at least according to the respective interframe differences comprises: determining, responding to the respective interframe differences to meet one preset condition respectively, the display image distance of any video frame in the at least two video frames to be larger than a reference display image. For facilitating description, the solution is called as "a first display image distance determining strategy". The respective interframe differences between every two adjacent video frames in N (N is an integer larger than 1) adjacent video frames in sequence in a unit time window can reflect the change tendency of the video content in the time window along with time to certain extent. In the solution, the respective interframe differences are compared with one preset condition respectively, the display image distances of respective video frames comprised in the time window are adjusted relative to the reference display image distance according to a comparison result. Specifically, if the respective interframe differences all meet the preset condition, it is indicated that the change tendency of the video content in the time window along with time is relatively stable, then a display image distance larger than the certain reference display image distance is determined as the display image distance of respective video frames in the N video frames comprised in the time window, which is favorable for improving determining accuracy of the display image distance; the solution is equivalent to the display of the N video frames at a farther position relative to the reference display image distance in a practical display process, thereby by using the feature that eyes have lower visual resolution for farther content, visual uncomfortable perception possibly caused when the eyes see the N video frames is weakened, and a viewing effect and user experience are improved.

Optionally, the determining the display image distance of at least one video frame in at least two video frames at least according to the respective interframe differences comprises: determining, responding to at least one in the respective interframe differences to not meet one preset condition, the display image distance of any video frame in the at least two video frames according to a reference display image distance. For facilitating description, the solution is called as "a second display image distance determining strategy". If at least one interframe difference in the respective interframe differences does not meet the preset condition, it is indicated that the change tendency of the video content in the time window along with time is not stable, then the display image distance of any video frame in the at least two video frames is determined according to the reference display image distance, for example, the display image distance of respective video frames in the N video frames are determined as the reference display image distance, etc. The solution is favorable for avoiding eye visual discomfort possibly generated by frequent adjusting of the display image distances of different video frames in a period of time.

Optionally, the determining the display image distance of at least one video frame in at least two video frames at least according to the respective interframe differences comprises: determining, responding to at least one of the respective interframe differences to not meet one preset condition, the display image distance of the latter video frame according to the display image distance of the former video frame in the at least two video frames. For facilitating description, the solution is called as "a third display image distance determining strategy". If at least one interframe difference in the respective interframe differences does not meet the preset condition, it is indicated that the change tendency of the video content in the time window along with time is not stable, then the display image distance of the latter video frame can be determined according to the display image distance of the former video frame, for example, the display image distances of respective video frames in N video frames are determined according to the display image distance of the first video frame, the display image distances of respective video frames in N video frames are the display image distance of the first video frame and the like; or for another example, the display image distance of the current video frame can be determined according to the display image distance of the former video frame, for example, the display image distance of the former video frame is determined as the display image distance of the current video frame; etc. The solution is favorable for avoiding eye visual discomfort possibly generated by frequent adjusting of the display image distances of different video frames in a period of time.

In the technical solution provided by the embodiment of the present application, the interframe difference between any two adjacent video frames shows difference degree of the display content corresponding to the two adjacent video frames, in a practical application process, different parameters can be selected to show the interframe difference as required, which is not limited by this embodiment of the present application.

(1) Optionally, the interframe difference between any two adjacent video frames in the at least two video frames comprises: optical parameter difference of pixels at multiple corresponding positions in the two adjacent video frames. The pixels at the corresponding positions in the two adjacent video frames comprise but are not limited to the pixels corresponding to same positions or same index numbers in the two adjacent video frames, the optical parameter difference of the pixels at respective corresponding positions reflects the interframe difference between the two adjacent video frames to certain extent, and the optical parameter difference is easier to capture and quantify, thereby, realizing complexity of the solution is favorably reduced.

Optionally, the optical parameters comprise at least one of following: brightness, chroma, and saturation degree; change of the brightness, chroma, and/or saturation degree can better reflect the interframe difference of two adjacent video frames. A preset condition based on the optical parameter difference and used for triggering a display image distance determining strategy is determined according to actual demands, which is not limited in this embodiment of the present application, optionally, the preset condition comprises at least one of following:

(11) A pixel number of the optical parameter difference exceeding an optical parameter threshold exceeds a pixel number threshold.

(12) A first specific value of the pixel number of the optical parameter difference exceeding an optical parameter threshold to the total number of the single frame pixels exceeds a pixel ratio threshold.

(13) A non-continuously distributed region number of pixels of the optical parameter difference exceeding an optical parameter threshold exceeds a region number threshold.

(14) A continuously distributed maximal region area of the pixels of the optical parameter difference exceeding an optical parameter threshold exceeds an area threshold.

(15) A second specific value of the continuously distributed maximal region area of the pixels of the optical parameter difference exceeding an optical parameter threshold to a single frame total area exceeds an area ratio threshold.

Above respective preset conditions can be independently used respectively, and can be combined for use to better capture and quantify the interframe difference of two adjacent video frames, and a realizing manner is very flexible. Specifically, the optical parameter difference comprises but is not limited to brightness difference, chroma difference and/or saturation degree difference. The brightness difference of the corresponding positions of the two adjacent video frames reflects the Temporal Perceptual Information (IT) of the video, a reason of the brightness difference of the corresponding positions of the two adjacent video frames comprises but is not limited to at least one of following: content difference of the corresponding positions of the two adjacent video frames, damage to the video content caused by a network factor, etc., which is not limited in this embodiment of the present application, the damage to the video content caused by the network factor comprises but is not limited to incomplete transmission or receiving of the content corresponding to the video frame, and the like. The following takes the brightness difference as an example for description, and a realizing manner of other optical parameter differences is similar and is not repeated herein.

For example, a preset condition comprises: a pixel number of the brightness difference exceeding a bright threshold value exceeds a pixel number threshold. In terms of two adjacent video frames, brightness of the pixels of the same index numbers or same positions of the two adjacent video frames can be compared to obtain the brightness difference of respective corresponding pixels of the two adjacent video frames; the continuous difference corresponding to respective pixels is compared with the brightness threshold to determine the pixel number of the brightness difference exceeding the brightness threshold; then the pixel number and the pixel number threshold are compared, if the pixel number exceeds the pixel number threshold, then the brightness difference between the two adjacent video frames meets the preset condition, and it is indicated to some extent that the two adjacent video frames have larger difference; otherwise, the brightness difference between the two adjacent video frames does not meet the preset condition, and it is indicated to some extent that the two adjacent video frames have smaller difference. In the solution, the interframe difference between two adjacent video frames is reflected by counting the pixel number of the optical parameters such as the brightness, therefore, time complexity between the two video frames is better reflected to adopt a corresponding the display image distance determining strategy, and the solution is easy to realize.

For another example, the preset condition comprises: a first specific value of the pixel number of the brightness difference exceeding a brightness threshold to the single pixel total number exceeds a pixel ratio threshold. In terms of any two adjacent video frames, the pixel number of the brightness difference exceeding a brightness threshold in the two adjacent video frames can be acquired to determine a specific value of the pixel number to the single frame pixel total number (called as a first specific value), the first specific value is compared with the pixel threshold, if the first specific value exceeds the pixel ratio threshold, it is indicated to some extent that the two adjacent video frame have larger difference; otherwise, the brightness difference between the two adjacent video frames does not meet the preset condition and it is indicated to some extent that the two adjacent video values have smaller difference.

For another example, the preset condition comprises: a non-continuously distributed region number of pixels of the brightness difference exceeding a brightness threshold exceeds a region number threshold. In terms of two adjacent video frames, the pixels of the brightness difference exceeding a brightness threshold in the two adjacent video frames can be acquired, according to the fact whether the spatial positions of the different pixels are adjacent or not, a distribution condition of these pixels can be determined, the region where the multiple pixels with adjacent spatial positions are is regarded as a continuously distributed region of a part of pixels, viewed as a whole, the continuously distributed region number of the multiple parts of pixels is equivalent to the non-continuously distributed region number of the pixels of the brightness difference exceeding the brightness threshold. Then, the non-continuously distributed region number of the pixels of the brightness difference exceeding the brightness threshold is compared with the region number threshold, if the non-continuously distributed region number of the pixels of the brightness difference exceeding a brightness threshold exceeds the region number threshold, the preset condition is met, and it is indicated to some extent that the two adjacent video frames have more regions with difference; otherwise, the preset condition is not met and it is indicated to some extent that the two adjacent video frames have less regions with difference. In the solution, a distribution condition of the pixels of the brightness difference exceeding a brightness threshold is used as a judgment factor, and it is favorable to improve the judging accuracy of the interframe difference of the two adjacent video frames.

For another example, the preset condition comprises: the continuously distributed maximal region area of the pixels of the brightness difference exceeding a brightness threshold value exceeds an area threshold. In terms of two adjacent video frames, continuously distributed respective regions of the pixels of the brightness difference exceeding a brightness threshold in the two adjacent video frames can be acquired, the maximal region area is determined, and is compared with the area threshold, if the maximal region area is larger than the area threshold, the preset condition is met, and it is indicated to some extent that the two adjacent video frames have larger areas with continuous difference; otherwise, the preset condition is not met, it is indicated to some extent that the two adjacent video frames have less areas with continuous difference. In the solution, the continuously distributed maximal region area of the pixels of the brightness difference exceeding a brightness threshold is used as a judgment factor, and it is favorable to improve the judging accuracy of the interframe difference of the two adjacent video frames.

For another example, the preset condition comprises: a second specific value of the continuously distributed region area of the pixels of the brightness difference exceeding a brightness threshold to a single frame total area exceeds an area ratio threshold. In terms of two adjacent video frames, the continuously distributed maximal region area of the pixels of the brightness difference exceeding the brightness threshold in the two adjacent video frames can be acquired, the specific value (called as a second specific value) of the maximal region area accounting for the distributed total area of respective single frame pixels is determined, the second specific value is compared with the area ratio threshold, if the second specific value exceeds the area ratio threshold, the preset condition is met, and it is indicated to some extent that the two adjacent video frames have a larger proportion of areas with continuous difference; otherwise, the preset condition is not met, and it is indicated to some extent that two adjacent video frames have a small proportion of areas with continuous difference. In the solution, a proportion of the continuously distributed maximal region area of the pixels of the brightness difference exceeding a brightness threshold is used as a judgment factor, and it is favorable to improve the judging accuracy of the interframe difference of the two adjacent video frames.

If the time window comprises three or more than three video frames, the above method can be adopted to respectively determine whether the brightness difference between every two adjacent video frames meets the one or more preset conditions, and a corresponding display image distance adjusting strategy is adopted according to a determining result, for example, the respective brightness differences between the every two adjacent video frames respectively meet the corresponding preset conditions, the display image distance of the corresponding video frame is determined by adopting the first display image distance determining strategy, and/or, for example, at least one of the respective brightness differences between the every two adjacent video frames does not meet the corresponding preset conditions, the display image distance of the corresponding video frame is determined by adopting the second or third display image distance determining strategy, etc.

(2) Optionally, the interframe difference between any two adjacent video frames in the at least two video frames comprises: displacement of the at least one display object between the two adjacent video frames. The displacement of the same display object between the two adjacent video frames reflects the movement information of the display object, if the displacement is larger, it is indicated to some extent that the movement of the display object in a refreshing time period of the two video frames is faster, otherwise, if the displace is smaller or even zero, it is indicated to some extent that the movement of the display object in a refreshing time period of the two video frames is slower or even relatively still. In the solution, through the displacement of the same display object between the two adjacent video frames, the movement information of the display object is convenient to capture and quantify, thereby realizing complexity of the solution is favorably reduced. A preset condition based on the movement information difference such as the displacement and used for triggering a display image distance determining strategy is determined according to actual demands, which is not limited in this embodiment of the present application, optionally, the preset condition comprises at least one of following:

(21) the preset condition comprises: expected refreshing information corresponding to displacement exceeds the refreshing capacity information of the display device. In the solution, movement information of a display object and the refreshing capability information are combined to adapt to the display image distance of the same display object at different video frames, and improve determining pertinence and effectiveness of the display image distance.

The refreshing capability information of the display device can be shown by a refreshing rate or period of the display device, if the display device has multiple refreshing rates or periods, any one refreshing rate or period (for example the currently arranged refreshing rate or period of the display device) can be adopted to show the refreshing capability information of display device, or, the highest refreshing rate or shortest refreshing period can be adopted as the refreshing capability of the display device, which is specifically determined according to application demands and is not limited in this embodiment of the present application. An image of the display object through the display device can be positioned on a display scene of the display device, or, at certain position in front of or behind the display screen of the display device.

The displacement of certain display object between two adjacent video frames is assumed as $s_0$, and the displacement of unit time is movement speed v of the display object. Usually, relative displacement $s_d$ of the image of the display object between the two adjacent video frames and saw by the eyes is smaller than certain threshold C (determined according to an eye visual feature, a visual characteristic of a user, empirical data or the like) to ensure that the eyes cannot see the phenomena of picture judder, lag and trailing caused by movement of the display object:

$$s_d = Rs_0 = \frac{f}{d_0}s_0 = \frac{fv}{d_0 t} \le C \quad (1)$$

wherein, $$R = \frac{f}{d_0}$$

is a zooming factor, f is an equivalent focus length of the image of the display object in certain video frame through the display device, $d_0$ is the distance between the image of the display object in certain video frame through the display device and the eyes (for example, pupils of the eyes), t is the refreshing rate of the display device (refreshing period is $$\frac{1}{t}\Big).$$

According to the displacement of the same display object between the two video frames, the expected refreshing information (for example, expected refreshing rate or period) of the formula (3) is met, the expected refreshing information and the refreshing capability information of the display device are compared, if the expected refreshing information exceeds the refreshing capability information of the display device (for example the expected refreshing rate is larger than the maximal refreshing rate of the display device, or the expected refreshing period is smaller than the minimal refreshing period of the display device), then the interframe difference of the two adjacent video frames should meet the preset condition, it is indicated that the probability that the refreshing capability of the display device insufficiently acquires a better visual effect of the corresponding video frame is larger; otherwise, the interframe difference between the two adjacent video frames cannot meet the preset condition, it is indicated that the probability that the refreshing capability of the display device can support the corresponding video frame to acquire a better visual effect is larger.

If certain time window comprises three or more than three video frames, the above method can be adopted to respectively determine whether the displacement of the same display object between every two adjacent video frames meets the preset condition, and a corresponding display image distance adjusting strategy is adopted according to a determining result, for example, the respective displacements of the same display object between the every two adjacent video frames respectively meet the corresponding preset conditions, the display image distance of the corresponding video frame is determined by adopting the first display image distance determining strategy, and/or, for example, at least one of the respective displacements of the same display object between the every two adjacent video frames does not meet the corresponding preset conditions, the display image distance of the corresponding video frame is determined by adopting the second or third display image distance determining strategy, etc.

Optionally, the video display control method also comprises: determining, responding to the expected refreshing information to not exceed the refreshing capability information, the refreshing information of the display device according to the expected refreshing information and the refreshing capability information; in this situation, the controlling the display device to display the at least one video frame at least according to the determined display image distance of the at least one video frame comprises: controlling the display device to display the at least one video frame according to the determined display image distance of the at least one video frame and the refreshing information. If the expected refreshing information does not exceed the refreshing capability information of the display device, it is indicated that by the adaption of refreshing information of the display device in a refreshing capability range of the display device, the probability that the display device smoothly displays corresponding video frame of the at least one display object is larger, the display device is set to display corresponding video frame with larger refreshing rate, to cause the refreshing rate of the display device displaying the corresponding video frame to be larger than or equal to or close to as much as possible the expected refreshing rate, in this way, through simple adaption of the refreshing information of the display device, the application demand of visual smooth display of the at least one display object relative to the eyes can be met, eye visual discomfort is relieved to some extent or even eliminated, a viewing effect and user experience are improved, the solution is simple and easy to realize and solution universality is improved.

(22) The preset condition comprises: the displacement exceeds allowable movement information corresponding to the refreshing capability information of the display device. In the solution, the display image distance of the same display object at different video frames can be adaptively adjusted by combining the movement information of the display object and the refreshing capability information, and the adjusting pertinence and effectiveness of the display image distance are improved.

It can be obtained through transformation of formula (3) that:

$$d_0 \geq \frac{fv}{Ct} \quad (2)$$

Size of the display image distance of the display object in certain video is:

$$d_s = d_0 - d_e \quad (3)$$

wherein, $d_s$ is display image distance of certain video frame, and content of the video frame comprises certain display object; $d_e$ is the distance from the eyes to the display device (for example, the distance from eye pupils to a lens optical center of the display device affecting imaging of the display object, etc.). According to formula 2 and formula 3, the allowable movement information corresponding to the maximal refreshing rate or minimal refreshing period of the display device is determined, the allowable movement information is compared with the displacement of the same display object between two adjacent video frames, if the displacement is larger than allowable movement information, then the interframe difference between the two adjacent video frames meets the preset condition, it is indicated that the probability that the refreshing capability of the display device insufficiently acquires a better visual effect of the corresponding video frame is larger; otherwise, the interframe difference between the two adjacent video frames cannot meet the preset condition, it is indicated that the probability that the refreshing capability of the display device can support the corresponding video frame to acquire a better visual effect is larger.

If certain time window comprises three or more than three video frames, the above method can be adopted to respectively determine whether the displacement of the same display object between every two adjacent video frames meets the preset condition, and a corresponding display image distance adjusting strategy is adopted according to a determining result; for example, the respective displacements of the same display object between the every two adjacent video frames respectively meet the corresponding preset conditions, the display image distance of the corresponding video frame is determined according to the first display image distance determining strategy, and the display image distance of the corresponding video frame can also be determined according to formula (2) and formula (3) to acquire a better visual effect; and/or, at least one of the respective displacements of the same display object between every two adjacent video frames does not meet the corresponding preset condition, the display image distance of the corresponding video frame can be determined by adopting the second or third display image distance determining strategy; etc.

Optionally, the video display control method also comprises: determining, responding to the displacement to not exceed the allowable movement information, the refreshing information of the display device according to the refreshing capability information; in this situation, the controlling the display device to display the at least one video frame at least according to the determined image distance of the at least one video frame comprises: controlling the display device to display the at least one video frame at least according to the determined image distance of the at least one video frame and the refreshing information. If the displacement of the same display object between the two adjacent video frames does not exceed the allowable movement information, it is indicated to some extent that by the adaption of refreshing information of the display device in a refreshing capability range of the display device, the probability that the display device smoothly displays the corresponding video frame of the at least one display object is larger, the display device is set to display corresponding video frame with larger refreshing rate, in this way, through simple adaption of the refreshing information of the display device, the application demand of visual smooth display of the at least one display object relative to the eyes can be met, eye visual discomfort is relieved to some extent or even eliminated, a viewing effect and user experience are improved, the solution is simple and easy to realize and solution universality is improved.

In the technical solution provided by the embodiment of the present application, the display device comprises but is not limited to a light field display, a near-to-eye display, a 3D display, a projection display, a binocular display device and the like, which is not limited by the embodiment of the present application. The imaging depth is to be felt by the binocular display device through binary disparity of left and right eyes, thereby a user experiences a stereoscopic imaging effect. In the situation of realizing the technical solution provided by this embodiment of the present application, the controlling the display device to display the at least one video frame at least according to the determined display image distance of the at least one video frame comprises: according to the determined display image distance of the at least one video frame, determining the binary disparity of the at least one video frame displayed by the binocular display device; and controlling the binocular display device to display the at least one video frame according to the determined display image distance of the at least one video frame and the binary disparity. The display image distance of certain display object in certain video frame and the binary disparity of the display object have certain corresponding relation, if the display image distance and the binary disparity are not matched, eye visual discomfort may be caused due to larger difference between an actual accommodation distance and a convergence distance. In the solution, the binary disparity of the display object in the corresponding video frame is determined according to the determined display image distance of the corresponding video frame, thereby, the visual discomfort of the user caused by the larger difference between the actual accommodation distance and the convergence distance due to the fact that the display image distance and the binary disparity are not matched is reduced as much as possible, and the visual effect and user experience are improved. Wherein, the binary disparity of the display object in the corresponding video frame can be determined by adopting but not limited to following formula:

$$d = \frac{fB}{Z_c} \quad (4)$$

wherein, d is the adjusted binary disparity of the display object in the video frame, f is equivalent focus length, B is distance between centers of left and right displays in the binocular display device, $Z_e$ is binocular convergence distance corresponding to the adjusted display image distance of the display object, wherein:

$$\left|\frac{1}{Z_d} - \frac{1}{Z_c}\right| \leq n, \frac{1}{3} \leq n \leq \frac{2}{3} \quad (5)$$

$Z_d$ is the display image distance of the display object at the corresponding video frame. In practical application, n is any number meeting the condition of $$\frac{1}{3} \le n \le \frac{2}{3},$$

and an example embodiment is very flexible. Further, n can also be determined according to duration of display time of the display object in the corresponding video frame, for example, $$n = \frac{1}{3}$$

so as to meet a diopter law to be met by the binocular 3D display, if the display time is shorter, then n can be increased, for example, $$n = \frac{2}{3},$$

etc. The solution is simple and easy to realize and it is favorable to acquire a better visual effect.

It may be understood by a person skilled in the art that, in any one of the foregoing methods of example embodiments of the present application, the value of the serial number of each step described above does not mean an execution sequence, and the execution sequence of the steps should be determined according to the function and internal logical thereof, and should not constitute any limitation to the implementation procedure of the example embodiments of the present application.

Figure 2:
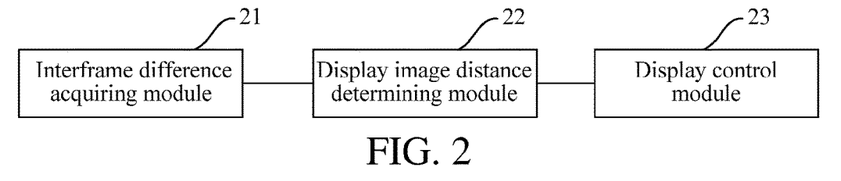
FIG. 2 is a logical block diagram of a first video display control apparatus according to an example embodiment of the present application.

FIG. 2 is a logical block diagram of a video display control apparatus according to an embodiment of the present application. As shown in the FIG. 2, the video display control apparatus provided by the embodiment of the present application comprises: an interframe difference acquiring module 21, a display image distance determining module 22 and a display control module 23.

The interframe difference acquiring module 21 is configured to acquire interframe differences between every two adjacent frames in at least two adjacent video frames in sequence of a video.

The display image distance determining module 22 is configured to determine a display image distance of at least one video frame in the at least two video frames at least according to respective interframe differences.

The first display control module 23 is configured to control the display device to display the at least one video frame at least according to the determined display image distance of the at least one video frame.

According to the technical solutions provided by embodiments of the present application, association between an interframe difference between at least two adjacent video frames and a display image distance in a video is established, the display image distance of the corresponding video frame is pertinently adjusted at least according to the interframe difference, the corresponding video frame is displayed at least according to the determined display image distance, therefore, by adaptive adjusting of the display image distance of the corresponding video frame, uncomfortable visual perception of the user possibly caused by the overlarge interframe difference can be weakened to certain extent, that is to say, the visual perception of the eyes to display effects such as a stuck screen, lag, judder or trailing possibly caused by the overlarge interframe difference is weakened to certain extent by adjusting the display image distance, thereby a visual effect and user experience are improved.

There is no limit to the manners in which the video display control apparatus is embodied. For example, the video display control apparatus may be an independent part, and the part cooperates with a display device in communication; or the video display control apparatus may be a functional module integrated in a display device, etc., which is not limited in this embodiment of the present application.

At least one video frame in the at least two video frames comprises any video frame in the at least two video frames. Optionally, the at least one video frame in the at least two video frames comprises: at least one former video frame in the at least two video frames and/or at least one latter video frame in the at least two video frames; at least two adjacent video frames in sequence in a video can comprise the situation of two adjacent video frames in the video and also comprise the situation of three adjacent video frames in sequence or more than three video frames in the video; and an application range of the technical solution provided by the embodiment of the present application is very broad.

Figure 3:
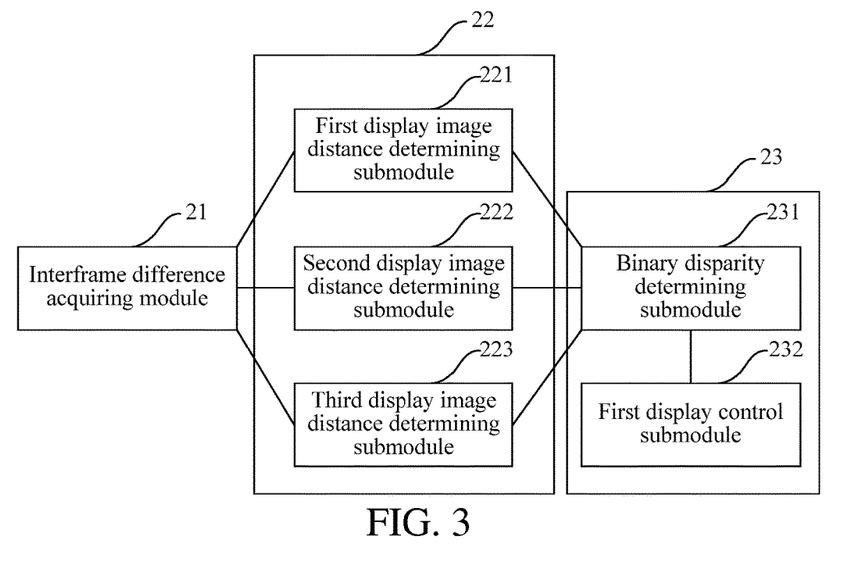
FIG. 3 is a logical block diagram of a second video display control apparatus according to an example embodiment of the present application.

The display device comprises but is not limited to a light field display, a near-to-eye display, a 3D display, a projection display, a binocular display device and the like, which is not limited by the embodiment of the present application. The imaging depth is felt by the binocular display device through binary disparity of left and right eyes, thereby a user experiences a stereoscopic imaging effect. In the situation of realizing the technical solution provided by this embodiment of the present application, as shown in FIG. 3, the display control module 23 comprises: a binary disparity determining submodule 231 and a first display control submodule 232. The binary disparity determining submodule 231 is configured to according to the determined display image distance of the at least one video frame, determine the binary disparity of the at least one video frame displayed by the binocular display device; and the first display control submodule 233 is configured to control the binocular display device to display the at least one video frame according to the determined display image distance of the at least one video frame and the binary disparity. In the solution, the binary disparity of the display object in the corresponding video frame is determined according to the determined display image distance of the corresponding video frame, thereby, the visual discomfort of the user caused by the larger difference between an actual accommodation distance and a convergence distance due to the fact that the display image distance and the binary disparity are not matched is reduced as much as possible, and the visual effect and user experience are improved.

Optionally, the display image distance determining module 22 comprises: a first display image distance determining submodule 221. The display image distance determining submodule 221 is configured to determine, responding to respective interframe difference to respectively meet a preset condition, the display image distance of any video frame in at least two video frames to be larger than a reference display image distance. In the solution, the respective interframe differences are compared with one preset condition respectively, the display image distances of respective video frames comprised in the time window are adjusted relative to the reference display image distance according to a comparison result, which is favorable for improving determining accuracy of the display image distance.

Optionally, the display image distance determining module 22 comprises: a second display image distance determining submodule 222. The second display image distance determining submodule 222 is configured to determine, responding to the respective interframe differences to not meet one preset condition, the display image distance of the latter video frame according to the display image distance of the former video frame in the at least two video frames. The solution is favorable for avoiding eye visual discomfort possibly generated by frequent adjusting of the display image distances of different video frames in a period of time.

Optionally, the display image distance determining module 22 comprises: a third display image distance determining submodule 223. The third display image distance determining submodule 223 is configured to determine, responding to the respective interframe differences to not meet one preset condition, the display image distance of the latter video frame according to the display image distance of the former video frame in the at least two video frames. The solution is favorable for avoiding eye visual discomfort possibly generated by frequent adjusting of the display image distances of different video frames in a period of time.

Optionally, the interframe difference between any two adjacent video frames in the at least two video frames comprises: optical parameter difference of pixels at multiple corresponding positions in the two adjacent video frames. The optical parameter difference of the pixels at multiple corresponding positions reflects the interframe difference between the two adjacent video frames to certain extent, and the optical parameter difference is easier to capture and quantify, thereby, realizing complexity of the solution is favorably reduced. Optionally, the optical parameters comprise at least one of following: brightness, chroma, and saturation degree; change of the brightness, chroma, and/or saturation degree can better reflect the interframe difference of two adjacent video frames. Optionally, the preset condition comprises at least one of following: a pixel number of the optical parameter difference exceeding an optical parameter threshold exceeds a pixel number threshold; a first specific value of the pixel number of the optical parameter difference exceeding an optical parameter threshold to the total number of the single frame pixels exceeds a pixel ratio threshold; a non-continuously distributed region number of pixels of the optical parameter difference exceeding an optical parameter threshold exceeds a region number threshold; a continuously distributed maximal region area of the pixel number of the optical parameter difference exceeding an optical parameter threshold exceeds an area threshold; and a second specific value of the continuously distributed maximal region area of the pixel number of the optical parameter difference exceeding an optical parameter threshold to a single frame total area exceeds an area ratio threshold. Above respective preset conditions can be independently used respectively, and can be combined for use to better capture and quantify the interframe difference of two adjacent video frames, and a realizing manner is very flexible.

Optionally, the interframe difference between any two adjacent video frames in the at least two video frames comprises: displacement of the at least one display object between the two adjacent video frames. In the solution, through the displacement of the same display object between the two adjacent video frames, the movement information of the display object is convenient to capture and quantify, thereby realizing complexity of the solution is favorably reduced.

Figure 4:
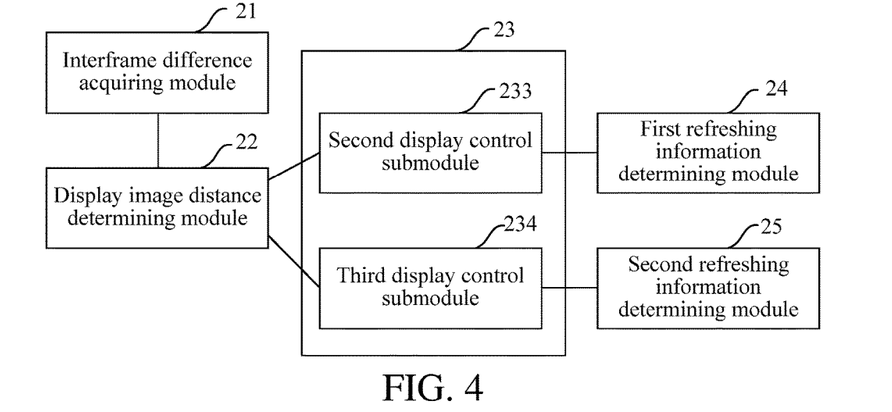
FIG. 4 is a logical block diagram of a third video display control apparatus according to an example embodiment of the present application.

In one optimal realizing manner, the preset condition comprises: expected refreshing information corresponding to displacement exceeds the refreshing capacity information of the display device. In the solution, movement information of a display object and the refreshing capability information are combined to adapt to the display image distance of the same display object at different video frames, and improve adjusting pertinence and effectiveness of the display image distance. Further optionally, in this situation, as shown in FIG. 4, the apparatus also comprises a first refreshing information determining module 24, the display control module 23 comprises a second display control submodule 233; the first refreshing information determining module 24 is configured to determine, responding to the expected refreshing information to not exceed the refreshing capability information, the refreshing information of the display device according to the expected refreshing information and the refreshing capability information; and the second display control submodule 233 is configured to control the display device to display the at least one video frame according to the determined display image distance of the at least one video frame and the refreshing information. In the solution, through simple adaption of the refreshing information of the display device, the application demand of visual smooth display of the at least one display object relative to the eyes can be met, eye visual discomfort is relieved to some extent or even eliminated, a viewing effect and user experience are improved, the solution is simple and easy to realize and solution universality is improved.

In another optional realizing manner, the preset condition comprises: the displacement exceeds allowable movement information corresponding to the refreshing capability information of the display device. In the solution, the display image distance of the same display object at different video frames can be adaptively adjusted by combining the movement information of the display object and the refreshing capability information, and the adjusting pertinence and effectiveness of the display image distance are improved. Further optionally, in this situation, the apparatus also comprises a second refreshing information determining module 25, the display control module comprises a third display control submodule 234; the second refreshing information determining module 25 is configured to determine, responding to the displacement to not exceed the allowable movement information, the refreshing information of the display device according to the refreshing capability information; and the third display control submodule 234 is configured to control the display device to display the at least one video frame according to the determined display image distance of the at least one video frame and the refreshing information. In the solution, through simple adaption of the refreshing information of the display device, the application demand of visual smooth display of the at least one display object relative to the eyes can be met, eye visual discomfort is relieved to some extent or even eliminated, a viewing effect and user experience are improved, the solution is simple and easy to realize and solution universality is improved.

Figure 5:
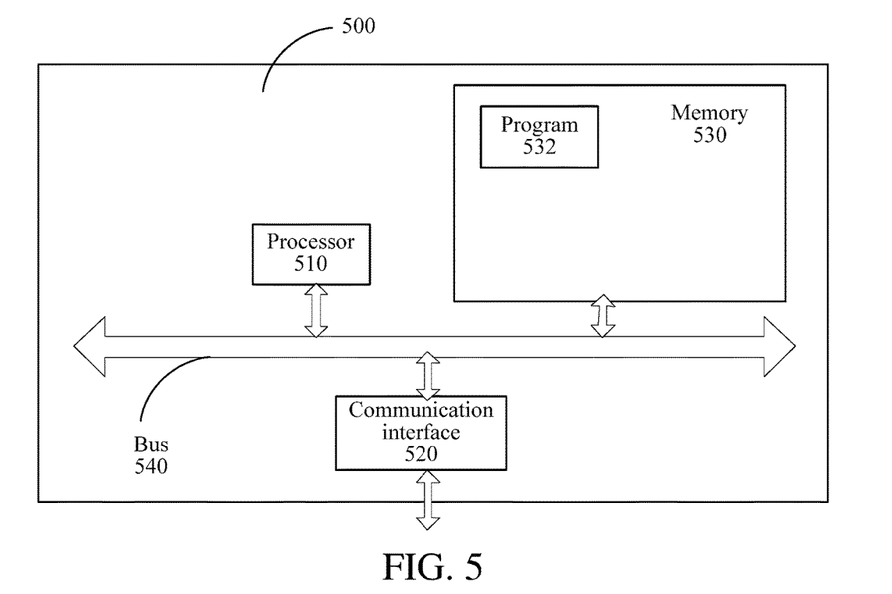
FIG. 5 is a logical block diagram of a display device according to an example embodiment of the present application.

FIG. 5 is a structural block diagram of a display device according to an embodiment of the present application, and an example embodiment of the display control device 500 is not limited by a specific embodiment of the present application. As shown in FIG. 5, the display device 500 may comprise:

a processor 510, a communication interface 520, a memory 530 and a communication bus 540, wherein, the processor 510, the communication interface 520, and the memory 530 communicate with one another by the communication bus 540.

The communication interface 520 is configured to communicate with an external device with a communication function.

The processor 510 is configured to execute a program 532, and specifically execute related steps in the embodiments of any method.

For example, the program 532 may comprise a program code, and the program code comprises at least one computer operation command.

The processor 510 may be a central processing unit (CPU), or an application specific integrated circuit (ASIC) or configured to implement one or more integrated circuits of the embodiments of the present application.

The memory 530 is configured to store the program 532. The memory 530 may comprise a random access memory (RAM), and may also comprise a non-volatile memory, such as at least one disk memory. For example, in one example embodiment, the processor 510 can execute the following steps by executing the program 532: acquiring interframe differences between every two adjacent frames in at least two adjacent video frames in sequence of a video; determining a display image distance of at least one video frame in the at least two video frames at least according to respective interframe differences; and displaying the at least one video frame at least according to the adjusted display image distance of the at least one video frame. In other example embodiments, the processor 510 can execute the steps mentioned in any other embodiment by executing the program 532, which is not repeated herein.

Implementation of each step in the program 532 refers to the corresponding description of corresponding steps, modules, submodules and units in foregoing embodiments, which is not repeated herein. A person of ordinary skill in the art can clearly understand that for convenient and brief description, a specific work process of the foregoing devices and modules may refer to the corresponding process description in the embodiments of the methods, which is not repeated herein.

In the foregoing embodiments of the present application, the serial number and/or sequence of the embodiments are only intended for the convenience of description, and do not represent inferiority or superiority of the embodiments. The description of each embodiment has a different focus. For any part of an embodiment not described in details, refer to relevant description of another embodiment. For relevant description of the implementation principle or process of apparatus, device or system embodiments, refer to records of relevant method embodiments, and the details are not described herein again.

A person of ordinary skill in the art may recognize that, the units, methods and procedures of each example described with reference to the embodiments disclosed herein, can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the display control methods in the embodiments of the present application. The foregoing storage medium comprises: any medium that can store program code, such as a USB flash drive, a removable hard disk, a read-only memory (ROM for short), a random access memory (RAM for short), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one example embodiment may be used in one or more other example embodiments by using a same or similar manner, combined with a feature of another example embodiment, or replace a feature of another example embodiment.

It should be emphasized that, the term "comprise" used herein refers to existence of a feature, an element, a step or a component, but does not exclude existence or addition of one or more other features, elements, steps or components.

Finally, it should be noted that, the above example embodiments are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. A method, comprising:
acquiring, by a system comprising a processor, interframe differences between every two adjacent frames in at least two adjacent video frames in a sequence of a video;
determining a display image distance of at least one video frame in the at least two video frames at least according to respective interframe differences of the interframe differences, wherein the display image distance is a depth of a plane on which an image of the at least one video frame is displayed; and
controlling a display device to display the at least one video frame at least according to the display image distance of the at least one video frame.

2. The method of claim 1, wherein the at least one video frame in the at least two video frames comprises at least one earlier video frame in the at least two video frames.

3. The method of claim 1, wherein the at least one video frame in the at least two video frames comprises at least one later video frame in the at least two video frames.

4. The method of claim 1, wherein the display device comprises a binocular display device, and wherein the controlling the display device to display the corresponding video frame at least according to the display image distance of the at least one video frame comprises:
    according to the display image distance of the at least one video frame, determining a binary disparity of the at least one video frame displayed by the binocular display device; and
    controlling the binocular display device to display the at least one video frame according to the display image distance of the at least one video frame and the binary disparity.

5. The method of claim 1, wherein the determining the display image distance of the at least one video frame in the at least two video frames according to the respective interframe differences comprises:
    in response to the respective interframe differences being determined to meet a preset condition respectively, determining the display image distance of any video frame in the at least two video frames to be larger than a reference display image.

6. The method of claim 1, wherein the determining the display image distance of the at least one video frame in the at least two video frames according to the respective interframe differences comprises:
    in response to at least one of the respective interframe differences being determined not to meet a preset condition, determining the display image distance of any video frame in the at least two video frames according to a reference display image distance.

7. The method of claim 1, wherein the determining the display image distance of the at least one video frame in the at least two video frames according to the respective interframe differences comprises:
    in response to the respective interframe differences being determined not to meet a preset condition, determining the display image distance of a later video frame according to the display image distance of an earlier video frame in the at least two video frames.

8. The method of claim 1, wherein an interframe difference between any two adjacent video frames in the at least two video frames comprises an optical parameter difference of pixels at multiple corresponding positions in the two adjacent video frames.

9. The method of claim 8, wherein an optical parameter relating to the optical parameter difference comprises at least one of: brightness, chroma or saturated degree.

10. The method of claim 8, wherein the determining the display image distance of the at least one video frame in the at least two video frames according to the respective interframe differences comprises determining that the respective interframe differences satisfy a preset condition, wherein the preset condition comprises at least one of:
    a pixel number of the optical parameter difference exceeding a first optical parameter threshold exceeds a pixel number threshold,
    a first value of the pixel number of the optical parameter difference exceeding a second optical parameter threshold for a total number of single frame pixels exceeds a pixel ratio threshold,
    a non-continuously distributed region number of pixels of the optical parameter difference exceeding a third optical parameter threshold exceeds a region number threshold,
    a continuously distributed maximal region area of the pixels of the optical parameter difference exceeding a fourth optical parameter threshold exceeds an area threshold, and
    a second value of the continuously distributed maximal region area of the pixels of the optical parameter difference exceeding a fifth optical parameter threshold to a single frame total area exceeds an area ratio threshold.

11. The method of claim 1, wherein an interframe difference between any two adjacent video frames in the at least two video frames comprises a displacement of at least one display object between any of the at least two adjacent video frames.

12. The method of claim 11, wherein the determining the display image distance of the at least one video frame in the at least two video frames according to the respective interframe differences comprises determining that the respective interframe differences satisfy a preset condition, wherein the preset condition comprises expected refreshing information corresponding to a displacement exceeds refreshing capacity information of the display device.

13. The method of claim 12, further comprising:
    in response to the expected refreshing information being determined not to exceed the refreshing capacity information, determining refreshing information of the display device according to the expected refreshing information and the refreshing capacity information, wherein the controlling the display device to display the at least one video frame at least according to the display image distance of the at least one video frame comprises controlling the display device to display the at least one video frame according to the display image distance of the at least one video frame and the refreshing information.

14. The method of claim 11, wherein the determining the display image distance of the at least one video frame in the at least two video frames according to the respective interframe differences comprises determining that the respective interframe differences satisfy a preset condition, wherein the preset condition comprises a displacement that exceeds allowable movement information corresponding to the refreshing capacity information of the display device.

15. The method of claim 14, further comprising:
    in response to the displacement being determined not to exceed the allowable movement information, determining refreshing information of the display device according to the refreshing capacity information, wherein the controlling the display device to display the at least one video frame at least according to the display image distance of the at least one video frame comprises controlling the display device to display the at least one video frame according to the display image distance of the at least one video frame and the refreshing information.

16. An apparatus, comprising:
    a memory that stores executable modules; and
    a processor, coupled to the memory, that executes or facilitates execution of the executable modules, the executable modules comprising:
        an interframe difference acquiring module configured to acquire interframe differences between every two adjacent frames in at least two adjacent video frames in a sequence of a video;
        a display image distance determining module configured to determine a display image distance of at least one video frame in the at least two video frames at least according to respective interframe differences of the interframe differences, wherein the display image distance is a depth of a plane on which an image of the video is displayed; and a display control module configured to control a display device to display the at least one video frame at least according to the display image distance of the at least one video frame.

17. The apparatus of claim 16, wherein the at least one video frame in the at least two video frames comprises at least one older video frame in the at least two video frames.

18. The apparatus of claim 16, wherein the at least one video frame in the at least two video frames comprises at least one newer video frame in the at least two video frames.

19. The apparatus of claim 16, wherein the display device comprises a binocular display device, and wherein the display control module comprises:
   a binary disparity determining submodule configured to, according to the display image distance of the at least one video frame, determine a binary disparity of the at least one video frame displayed by the binocular display device; and
   a first display control submodule configured to control the binocular display device to display the at least one video frame according to the display image distance of the at least one video frame and the binary disparity.

20. The apparatus of claim 16, wherein the display image distance determining module comprises a display image distance determining submodule configured to determine, responsive to the respective interframe differences meeting a preset condition, the display image distance of any video frame in the at least two video frames to be larger than a reference display image distance.

21. The apparatus of claim 16, wherein the display image distance determining module comprises a display image distance determining submodule configured to determine, responsive to the respective interframe differences meeting a preset condition, a first display image distance of a newer video frame according to a second display image distance of an older video frame in the at least two video frames.

22. The apparatus of claim 16, wherein the display image distance determining module comprises a display image distance determining submodule configured to determine, responsive to the respective interframe differences not meeting a preset condition, a first display image distance of a newer video frame according to a second display image distance of an older video frame in the at least two video frames.

23. The apparatus of claim 16, wherein an interframe difference between any two adjacent video frames in the at least two video frames comprises a difference of an optical parameter of pixels at multiple corresponding positions in the any two adjacent video frames.

24. The method of claim 23, wherein the optical parameter comprises at least one of: brightness, chroma or saturated degree.

25. The method of claim 23, wherein the display image distance determining module is further configured to determine whether the respective interframe differences meet a preset condition, and wherein the preset condition comprises at least one of:
   a pixel number of the difference of the optical parameter exceeding a first optical parameter threshold exceeds a pixel number threshold,
   a first specific value of the pixel number of the difference of the optical parameter exceeding a second optical parameter threshold to the total number of the single frame pixels exceeds a pixel ratio threshold,
   a non-continuously distributed region number of pixels of the difference of the optical parameter exceeding a third optical parameter threshold exceeds a region number threshold,
   a continuously distributed maximal region area of the pixels of the difference of the optical parameter exceeding a fourth optical parameter threshold exceeds an area threshold, and
   a second specific value of the continuously distributed maximal region area of the pixels of the difference of the optical parameter exceeding a fifth optical parameter threshold to a single frame total area exceeds an area ratio threshold.

26. The apparatus of claim 16, wherein an interframe difference between any two adjacent video frames in the at least two video frames comprises a displacement of at least one display object between the any two adjacent video frames.

27. The apparatus of claim 26, wherein the display image distance determining module is further configured to determine whether the respective interframe differences meet a preset condition, wherein the preset condition comprises expected refreshing information corresponding to the displacement exceeds refreshing capacity information of the display device.

28. The apparatus of claim 27, wherein the executable modules further comprise a first refreshing information determining module configured to determine, responsive to the expected refreshing information being determined not to exceed the refreshing capacity information, refreshing information of the display device according to the expected refreshing information and the refreshing capacity information, and
   wherein the display control module comprises another display control module configured to control the display device to display the at least one video frame according to the display image distance of the at least one video frame and the refreshing information.

29. The apparatus of claim 16, wherein the display image distance determining module is further configured to determine whether the respective interframe differences meet a preset condition, wherein the preset condition comprises a displacement that exceeds allowable movement information corresponding to the refreshing capacity information of the display device.

30. The apparatus of claim 29, wherein the executable modules further comprise another refreshing information determining module configured to determine, responsive to the displacement being determined not to exceed the allowable movement information, refreshing information of the display device according to the refreshing capability information, wherein the display control module comprises another display control module configured to control the display device to display the at least one video frame according to the display image distance of the at least one video frame and the refreshing information.

31. A display device, comprising:
   a processor, a communication interface, a memory and a communication bus, wherein the processor, the communication interface, and the memory communicate with one another via the communication bus, wherein the memory is configured to store at least one command, and wherein the command causes the processor to execute operations, comprising:
     acquiring interframe differences between every two adjacent frames in at least two adjacent video frames in a sequence of frames of a video;

adjusting a display image distance of at least one video frame in the at least two video frames at least according to respective interframe differences resulting in an adjusted display image distance, wherein the display image distance is a depth of a plane on which an image of the video is displayed; and displaying the at least one video frame at least according to the adjusted display image distance of the at least one video frame.

32. A non-transitory computer readable storage apparatus, comprising at least one executable instruction, which, in response to execution, causes a video to be displayed via a video display, comprising:

acquiring respective interframe differences between every two adjacent frames in at least two adjacent video frames in sequence of a video;

determining a display image distance of a video frame in the at least two video frames at least according to the respective interframe differences, wherein the display image distance is a depth of a plane on which an image of the video is displayed; and controlling the display device to display the video frame at least according to the determined display image distance of the video frame.

\* \* \* \* \*